United States Patent
Lakshminarayanan et al.

(10) Patent No.: US 11,341,433 B2
(45) Date of Patent: May 24, 2022

(54) ROUTING AND NAVIGATION SYSTEM

(71) Applicant: International Business Machines Corporation, Armonk, NY (US)

(72) Inventors: Mahalakshmi Lakshminarayanan, Austin, TX (US); Rajaram B. Krishnamurthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 16/691,561

(22) Filed: Nov. 21, 2019

(65) Prior Publication Data
US 2021/0158233 A1 May 27, 2021

(51) Int. Cl.
| | |
|---|---|
| *H04W 4/90* | (2018.01) |
| *G06N 5/02* | (2006.01) |
| *G06Q 10/04* | (2012.01) |
| *G06Q 50/26* | (2012.01) |
| *G06Q 50/30* | (2012.01) |
| *G08G 1/00* | (2006.01) |
| *G08G 1/0968* | (2006.01) |
| *H04W 4/024* | (2018.01) |
| *G08G 1/09* | (2006.01) |
| *G01C 21/34* | (2006.01) |

(52) U.S. Cl.
CPC ....... *G06Q 10/047* (2013.01); *G01C 21/3415* (2013.01); *G06N 5/02* (2013.01); *G06Q 50/265* (2013.01); *G06Q 50/30* (2013.01); *G08G 1/093* (2013.01); *G08G 1/096816* (2013.01); *G08G 1/202* (2013.01); *H04W 4/024* (2018.02)

(58) Field of Classification Search
CPC .... G06Q 10/047; G06Q 50/265; G06Q 50/30; H04W 4/024; G01C 21/3415; G06N 5/02; G08G 1/093; G08G 1/096816; G08G 1/202
See application file for complete search history.

(56) References Cited

U.S. PATENT DOCUMENTS

| | | | |
|---|---|---|---|
| 7,579,945 | B1 | 8/2009 | Richter |
| 8,300,560 | B2 | 10/2012 | Nowlan |
| 8,422,987 | B2 | 4/2013 | Kane |
| 9,285,504 | B2 | 3/2016 | Dannevik |

(Continued)

FOREIGN PATENT DOCUMENTS

| | | |
|---|---|---|
| EP | 2881707 A1 | 6/2015 |
| JP | 2012203595 A | 10/2012 |

OTHER PUBLICATIONS

"Emergency and Disaster Information Service," RSOE EDIS, accessed Oct. 9, 2019, 3 pages, <hisz.rsoe.hu/>.

(Continued)

*Primary Examiner* — Mathew Franklin Gordon
(74) *Attorney, Agent, or Firm* — Richard B. Thomas

(57) ABSTRACT

Embodiments relate to a system, program product, and method for dynamically providing navigation and transportation to individuals for passage from an emergency-stricken location to an emergency haven. Traffic of users from the emergency-stricken location to the emergency haven is dynamically regulated at least partially due to real-time traffic densities, predicted traffic densities, and the number of in transit users. In addition, a population of users at the emergency haven is dynamically regulated at least partially subject to an existing population and a predicted population at each emergency haven.

20 Claims, 11 Drawing Sheets

(56) References Cited

U.S. PATENT DOCUMENTS 9,299,245 B2 3/2016 Vartiainen
2017/0023369 A1 1/2017 Mohler

OTHER PUBLICATIONS

"Global Disaster Alert and Coordination System," GDACS, accessed Oct. 9, 2019, 4 pages, <https://gdacs.org/>.

Frost, "Fires: Spotted from satellites, warned by phone," SciDev. Net, Nov. 11, 2009, 3 pages. <https://www.scidev.net/global/disasters/opinion/fires-spotted-from-satellites-warned-by-phone-1.html>.

Mell et al., "The NIST Definition of Cloud Computing," Recommendations of the National Institute of Standards and Technology, U.S. Department of Commerce, Special Publication 800-145, Sep. 2011, 7 pages.

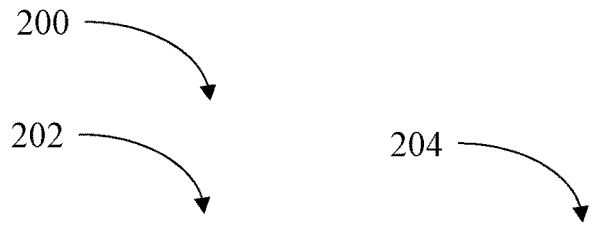

| Emergency | Location Conditions |
|---|---|
| Flood | Sturdy Buildings with # of floors > 2 |
| Flood – Category 5 | Sturdy Buildings with # of floors > 3 |
| Tornado | Buildings with basements; tall buildings with multiple floors |
| Tsunami | 2 miles away from shoreline / building with # of floors > 5 within 1 mile |
| Forest Fires | 5 miles away from fires; nearby water bodies |
| Poisonous Gas / Nuclear Leak | 1 mile away from leak |

FIG. 2

ROUTING AND NAVIGATION SYSTEM

BACKGROUND

The present disclosure relates to an artificial intelligence platform and the routing, guiding, navigating, and pooling of people, and, more specifically, for dynamically providing navigation and transportation to individuals and groups of individuals for passage from an emergency-stricken location to an emergency haven.

Natural and man-made disaster-level incidents are well-known for generating emergency conditions that may require evacuation of individuals from the affected areas. During such evacuation, it is possible that a large number of individuals will be leaving the affected areas and seeking haven and shelter elsewhere.

SUMMARY

A system, computer program product, and method are provided for dynamically providing navigation and transportation to individuals and groups or pools of individuals for passage from an emergency-stricken location to an emergency haven.

In one aspect, a computer system is provided to dynamically provide routing and navigation to individuals for passage from an emergency-stricken location to an emergency haven. The system includes a processing device operably coupled to memory and a plurality of wireless devices. The system also includes a knowledge base operatively coupled to the processing device. The knowledge base includes data associated with routing people from one or more first locations to one or more second locations. The system further includes an artificial intelligence (AI) platform, in communication with the knowledge base. The AI platform includes an alert manager configured to transmit at least one notification to a first plurality of users through one or more wireless devices of the plurality of wireless devices at the one or more first locations. The at least one notification is initiated at least partially due to one or more first physical conditions associated with the one or more first locations. The AI platform also includes a navigation manager configured to determine the one or more second locations, the one or more second locations different from the one or more first locations. Each second location of the one or more second locations is determined to provide at least partial protection from the first physical conditions associated with the one or more first locations. The alert manager is further configured to dynamically regulate traffic of a second plurality of users from the one or more first locations to the one or more second locations. The second plurality of users includes at least a portion of the first plurality of users in transit to the one or more second locations. The alert manager is also configured to generate one or more predicted traffic densities between the one or more first locations to the one or more second locations. At least a portion of the second plurality of users is in possession of at least one of the one or more wireless devices. The alert manager is further configured to transmit, to the second plurality of users, routing information from the one or more first locations to the one or more second locations. The routing information is subject to the one or more predicted traffic densities and a dynamic regulation of one or more real-time traffic densities.

In another aspect, a computer program product is provided to dynamically provide routing and navigation to individuals and pools of individuals for passage from an emergency-stricken location to an emergency haven. The computer program product includes one or more computer readable storage media, and program instructions collectively stored on the one or more computer storage media. The product includes program instructions to transmit, to a first plurality of users, through one or more wireless devices, at the one or more first locations, at least one notification. The at least one notification is initiated at least partially due to one or more first physical conditions associated with the one or more first locations. The one or more second locations are determined, where the one or more second locations are different from the one or more first locations. Each second location of the one or more second locations is determined to provide at least partial protection from the first physical conditions associated with the one or more first locations. Traffic of a second plurality of users is dynamically regulated from the one or more first locations to the one or more second locations. The second plurality of users includes at least a portion of the first plurality of users in transit to the one or more second locations. One or more predicted traffic densities are between the one or more first locations to the one or more second locations are generated. At least a portion of the second plurality of users is in possession of at least one of the one or more wireless devices. Routing information from the one or more first locations to the one or more second locations is transmitted to the second plurality of users. The routing information is subject to the one or more predicted traffic densities and a dynamic regulation of one or more real-time traffic densities.

In yet another aspect, a computer-implemented method to dynamically provide routing and navigation to individuals for passage from an emergency-stricken location to an emergency haven. The method includes transmitting, to a first plurality of users, through one or more devices at the one or more first locations, at least one notification. The at least one notification is initiated at least partially due to one or more first physical conditions associated with the one or more first locations. The method also includes determining one or more second locations, where the one or more second locations different from the one or more first locations. Each second location of the one or more second locations is determined to provide at least partial protection from the one or more first physical conditions associated with the one or more first locations. The method further includes dynamically regulating traffic of a second plurality of users from the one or more first locations to the one or more second locations. The second plurality of users includes at least a portion of the first plurality of users in transit to the one or more second locations. The method also includes generating one or more predicted traffic densities between the one or more first locations to the one or more second locations. At least a portion of the second plurality of users in possession of at least one of one or more wireless devices. The method further includes transmitting, to the second plurality of users, routing information from the one or more first locations to the one or more second locations. The routing information is subject to the one or more predicted traffic densities and a dynamic regulation of one or more real-time traffic densities.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 2 is a table illustrating a brief listing of emergency conditions and general location conditions that may provide an emergency haven from the emergency conditions, in accordance with some embodiments of the present disclosure.

Figure 1:
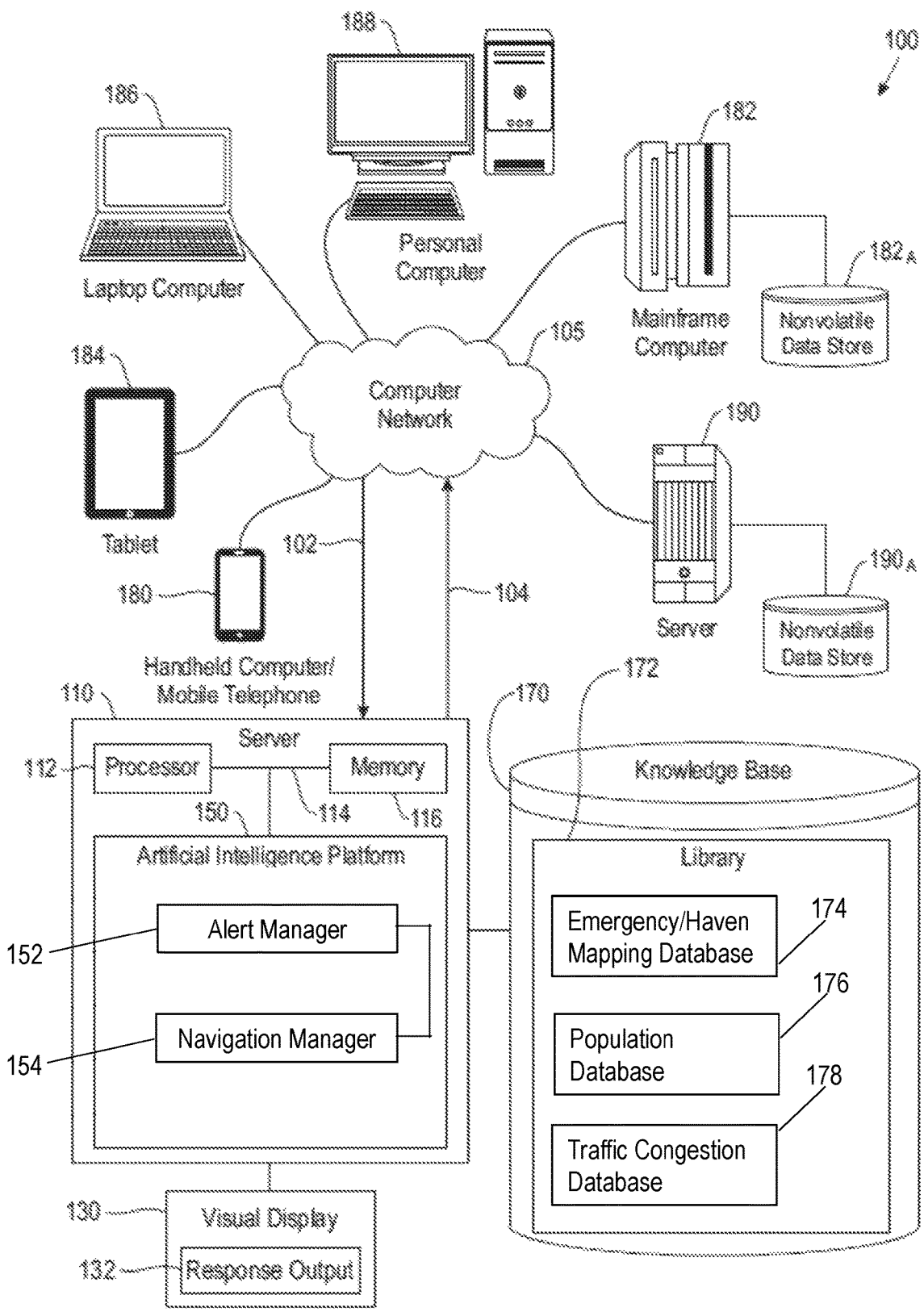
FIG. 1 is a schematic diagram illustrating an artificial intelligence computing platform suitable for dynamically providing navigation and transportation to individuals for passage from an emergency-stricken location to an emergency haven, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, machine learning (ML) systems process large volumes of data, seemingly related or unrelated, where the ML systems may be trained with data derived from a database or corpus of knowledge. The ML systems look for and determine patterns, or lack thereof, in the data, "learn" from the patterns in the data, and ultimately accomplish tasks without being given specific instructions. In addition, the ML systems, utilizes algorithms, represented as machine processable models, to learn from the data and create foresights based on this data. More specifically, ML is the application of AI, such as, and without limitation, through creation of neural networks that can demonstrate learning behavior by performing tasks that are not explicitly programmed. Deep learning is a type of neural-network ML in which systems can accomplish complex tasks by using multiple layers of choices based on output of a previous layer, creating increasingly smarter and more abstract conclusions.

ML learning systems may have different "learning styles." One such learning style is supervised learning, where the data is labeled to train the ML system through telling the ML system what the ley characteristics of a thing are with respect to its features, and what that thing actually is. If the thing is an object or a condition, the training process is called classification. If the thing is a number, the training process is called regression. Accordingly, supervised learning specializes in predicting the future.

A second learning style is unsupervised learning, where commonalities and patterns in the input data are determined by the ML system through little to no assistance by humans. Most unsupervised learning focuses on clustering, i.e., grouping the data by some set of characteristics or features. These may be the same features used in supervised learning, although unsupervised learning typically doesn't use labeled data. Accordingly, unsupervised learning may be used to find outliers and anomalies in a dataset.

The third learning style is reinforcement learning, where positive behavior is "rewarded: and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to most appropriately respond to certain stimuli or environments.

Accordingly, over time, this behavior reinforcement facilitates determining the optimal behavior for a particular environment or situation.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Therefore, deep learning is used to predict an output given a set of inputs, and either supervised learning or unsupervised learning can be used to facilitate such results.

Natural and man-made disaster-level incidents are well-known for generating emergency conditions that may require evacuation of individuals from the affected areas. During such evacuation, it is possible that a large number of individuals will be leaving the affected areas and seek haven and shelter elsewhere. However, while some of the evacuating individuals may have a predetermined place to ride-out the event, many individuals will attempt a trial and error approach to finding an emergency haven. Many of the attempted emergency havens may be suitable for protection against one set of environmental hazards, however, may not be suitable for the hazard at hand. In addition, a rapid evacuation of a large number of people will likely result in traffic congestion and overcrowding of the emergency havens. Moreover, a number of individuals may be unaware of the hazard, or stranded along the way to an emergency haven, and require assistance to proceed to an emergency haven.

Referring to FIG. 1, a schematic diagram of a routing and navigation system 100 is illustrated. In at least one embodiment, the routing and navigation system 100 is embodied as an artificial intelligence platform computing system. As shown, a server 110 is provided in communication with a plurality of computing devices 180, 182, 184, 186, 188, and 190 across a computer network connection 105. The computer network may include several information handling devices. Types of information handling devices that can utilize the routing and navigation system 100 range from small handheld devices, such as a handheld computer/mobile telephone 180 to large mainframe systems, such as a mainframe computer 182. Examples of information handling systems includes, personal digital assistants (PDAs), personal entertainment devices, pen or tablet computer 184, laptop or notebook computer 186, personal computer system 188, and server 190. As shown, the various information handling systems can be networked together using the computer network connection 105.

Various types of a computer networks can be used to interconnect the various information handling systems, including Local Area Networks (LANs), Wireless Local Area Networks (WLANs), the Internet, the Public Switched Telephone Network (PSTN), other wireless networks, and any other network topology that can be used to interconnect information handling systems and computing devices as described herein. Many of the information handling systems include non-volatile data stores, such as hard drives and/or non-volatile memory. Some of the information handling systems may use separate non-volatile data stores, e.g., server 190 utilizes non-volatile data store 190a, and mainframe computer 182 utilizes non-volatile data store 182a. The non-volatile data store 182a can be a component that is external to the various information handling systems or can be internal to one of the information handling systems.

The server 110 is configured with a processing device 112 in communication with memory 116 across a bus 114. The server 110 is shown with an artificial intelligence (AI) platform 150 for cognitive computing, including machine learning, over the computer network connection 105 from one or more of the computing devices 180, 182, 184, 186, 188, and 190. More specifically, the computing devices 180, 182, 184, 186, 188, and 190 communicate with each other and with other devices or components via one or more wired and/or wireless data communication links, where each communication link may comprise one or more of wires, routers, switches, transmitters, receivers, or the like. In this networked arrangement, the server 110 and the computer network connection 105 enable communication, detection, recognition, and resolution. The server 110 is in operative communication with the computer network through communications links 102 and 104. Links 102 and 104 may be wired or wireless. Other embodiments of the server 110 may be used with components, systems, sub-systems, and/or devices other than those that are depicted herein.

The AI platform 150 is shown herein configured with tools to enable one or more of the supervised learning techniques to make predictions and one or more of the unsupervised learning techniques to generate conclusions based on new information. The tools function to implement a methodology for dynamically providing navigation and transportation to individuals for passage from an emergency-stricken location to an emergency haven. It is understood in the art that in at least one embodiment, a disastrous event may result in a large number of evacuees to be transferred from a disaster locations to an emergency haven over a short period of time. Accordingly, in at least one embodiment, machine learning techniques are used to train the AI platform 150 to determine a course of action on an event-by-event, individual-by-individual, and a haven-by-haven basis to dynamically provide navigation and transportation to individuals for passage from an emergency-stricken location to an emergency haven.

The tools shown herein include, but are not limited to, an alert manager 152 and a navigation manager 154, where the alert manager 152 and the navigation manager 154 include the machine learning (ML) features. The alert manager 152 and the navigation manager 154 are described further herein with respect to FIG. 5. The AI platform 150 may receive input from the computer network connection 105 and leverage a knowledge base 170, also referred to herein as a corpus or data source, to selectively access training and other data. The knowledge base 170 is provided operably coupled to the server 110 including the processing device 112 and/or memory 116. In at least one embodiment, the knowledge base 170 may be operably coupled to the server 110 across the computer network connection 105. In at least one embodiment, the knowledge base 170 includes a library 172 that may be in the form of one or more a databases. The library 172 includes different databases, including, but not limited to, an emergency/haven mapping database 174, a population database 176, and a traffic congestion database 178, where the three databases are described further herein. Accordingly, the server 110 including the AI platform 150, the alert manager 152, and the navigation manager 154 receive information from the computer network connection 105 and the devices connected thereto, and the knowledge base 170.

The emergency/haven mapping database 174 includes emergency data and related emergency haven data. Referring to FIG. 2, a table 200 of emergency conditions data is provided illustrating a brief, non-exhaustive listing of emergency conditions 202 and associated general location conditions data 204 that may at least partially define an emergency haven from the emergency conditions. The emergency conditions 202 include emergency conditions that are possible for a given location. The emergency conditions 202 also include additional data (not shown) particularly associated with each emergency such as, without limitation, more granular definition and description of the conditions, historical frequency, severity, and environmental conditions that affect the severity, and receives and stores updated conditions as provided through the computer network connection 105 during real-time emergencies. In addition, the general location conditions data 204 includes those conditions of an emergency haven that will provide protection against the associated hazard.

As shown in FIG. 2, the general location conditions data 204 provide the user with broad guidance on what type of shelter to seek. In addition, the data resident within the emergency/haven mapping database 174 includes structural data associated with public structures available for users to take shelter within that meet the criteria in the general location conditions data 204. Such infrastructural data includes, without limitation, the number of floors, the presence of a basement, the seismic shock resiliency or rating, wall thickness, construction materials, grade above sea level, ventilations systems, and emergency power availability. Moreover, the emergency/haven mapping database 174 includes map data of the vicinities associated with the potential emergency locations, the associated emergency havens, and the routes therebetween. In at least one embodiment, the map data is received from one or more commercially and/or publicly available mapping systems and applications. In at least one embodiment, the map data includes data representative of features from one or more of, and without limitation, physical maps, road/street/highway maps, topographic maps, time-zone maps, geologic maps, zip code maps, weather maps. In at least one embodiment, the mapping data is collected and stored for potential emergency locations and emergencies, with the routing and navigation system 100 updating the associated data in real-time during emergencies. In at least one embodiment, selected private structures, such as, and without limitation, private buildings are also included with public buildings in an inventory of the emergency havens 424 resident within the emergency/haven mapping database 174. Accordingly, the emergency/haven mapping database 174 includes data that relates emergency condition, general emergency haven characteristics, and mapping information for providing users routes with associated navigation instructions.

In at least one embodiment, as an example of deployment of the data in the emergency/haven mapping database 174, the alert manager 152 will look up the safety conditions corresponding to the type and magnitude of the emergency at the emergency/haven mapping database 174 and obtain the building/location conditions for the appropriate emergency haven. Accordingly, the emergency/haven mapping database 174 includes data associated with emergency conditions related to locations with the conditions that offer shelter against the emergency conditions, where the emergency data and location conditions data are available to the user with various degrees of granularity. Use of the aforementioned data is discussed further herein with reference to FIGS. 4 and 5.

Referring again to FIG. 1, the population database 176 includes data associated with, and without limitation, a population capacity of each emergency haven, historical populations and population densities for each emergency haven for each emergency (locally and more broadly associated with other geographic locations with similar conditions using similarly configured emergency havens), the predicted populations and population densities at each emergency haven, predicted changes in populations at each emergency haven as a function of real-time feedback of the number of in transit users directed toward the respective emergency havens, the period of time estimated for each in transit user to arrive at each respective emergency haven based on their measured rate of progress, and actual real-time changes in population at each emergency haven through feedback from an arrival at each second location of the in transit users, and real-time changes to the number of in transit users directed toward the respective second locations. The use of the aforementioned data is discussed further herein with reference to FIGS. 4 and 5.

The traffic congestion database 178 includes data associated with, and without limitation, a traffic capacity of each thoroughfare that users of the routing and navigation system 100 may use to transit from the emergency location to the emergency haven, historical traffic conditions including traffic densities expected for similar days and times without an emergency for establishing baseline conditions, historical optimized traffic routing in previous similar emergency conditions along the associated thoroughfares, historical traffic and traffic density for each emergency recorded locally and more broadly associated with other geographic locations with similar conditions using similarly configured geographies, the predicted traffic and traffic densities and the expected changes between the affected areas and the emergency havens at least partially as a function of the users routed by the routing and navigation system 100, real-time feedback of the number of in transit users directed toward the respective emergency havens, and actual real-time changes in the population at each emergency haven through feedback from an arrival at each second location of the in transit users, and those users that have not started but will be routed through the associated thoroughfares. The use of the aforementioned data is discussed further herein with reference to FIGS. 4 and 5.

Response output 132 in the form of display of dynamic emergency haven including, without limitation, location information for each emergency haven, distance to each location, time to reach each location, present and predicted populations and population densities of each location, the capacity of each location, the safety features of the locations, a safety score of each location, and details of the displayed route, including traffic congestion and emergency pooling vehicle information. Details of the information displayed is described in FIGS. 4 and 5.

In at least one embodiment, the response output 132 is communicated to a corresponding network device, shown herein as a visual display 130, operatively coupled to the server 110 or in at least one other embodiment, operatively coupled to one or more of the computing devices 180-190 across the computer network connection 105.

The computer network connection 105 may include local network connections and remote connections in various embodiments, such that the artificial intelligence platform 150 may operate in environments of any size, including local and global, e.g. the Internet. Additionally, the AI platform 150 serves as a front-end system that can make available a variety of knowledge extracted from or represented in network accessible sources and/or structured data sources. In this manner, some processes populate the AI platform 150, with the AI platform 150 also including one or more input interfaces or portals to receive requests and respond accordingly.

Figure 3:
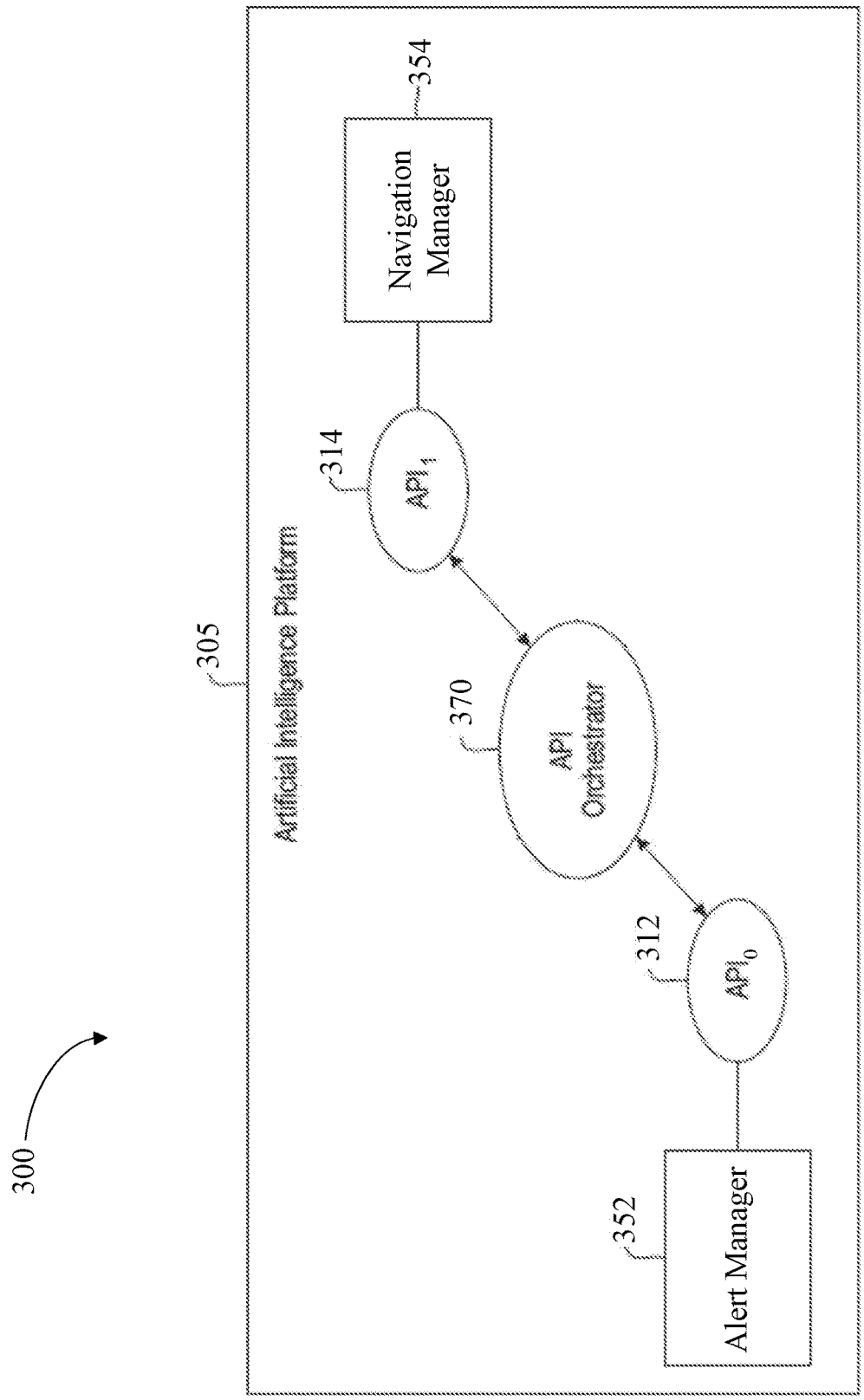
FIG. 3 is a block diagram illustrating artificial intelligence platform tools, as shown and described in FIG. 1, and their associated application program interfaces, in accordance with some embodiments of the present disclosure.

An Application Program Interface (API) is understood in the art as a software intermediary, e.g. invocation protocol, between two or more applications which may run on one or more computing environments. With respect to the AI platform 150 shown and described in FIG. 1, one or more APIs may be utilized to support one or more of the tools 152-154 and their associated functionality. Referring to FIG. 3, a block diagram 300 is provided illustrating the tools 352-354 and their associated APIs. As shown, a plurality of tools is embedded within the AI platform 305, that is equivalent to the AI platform 150 (shown in FIG. 1). The AI platform 305 includes the tools including, but not limited to, the alert manager 152 (shown herein as 352) associated with $API_0$ 312 and the navigation manager 154 (shown herein as 354) associated with $API_1$ (314). Each of the APIs may be implemented in one or more languages and interface specifications. $API_0$ 312 provides functional support to, without limitation, collect and organize the data associated with emergency conditions, computed population and population densities (real-time and predicted), safety scores of the emergency havens, predicted traffic congestion, request emergency havens from the navigation manager at least partially based on emergency conditions and locations to avoid, and perform emergency vehicle management. APE 314 provides functional support for determining potential emergency havens based on, without limitation, general location conditions data provided by the alert manager 152, an estimated distance to the emergency haven, an estimated time for a user to reach the emergency haven, the number of floors, the presence of a basement, the seismic shock resiliency or rating, wall thickness, construction materials, grade above sea level, ventilations systems, and emergency power availability, geographic map data, as well as integration of the emergency haven location data, the additional emergency haven infrastructure information, and the map data to generate integrated emergency haven mapping data.

As shown, each of the APIs 312 and 314 are operatively coupled to an API orchestrator 370, otherwise known as an orchestration layer, which is understood in the art to function as an abstraction layer to transparently thread together the separate APIs. In at least one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
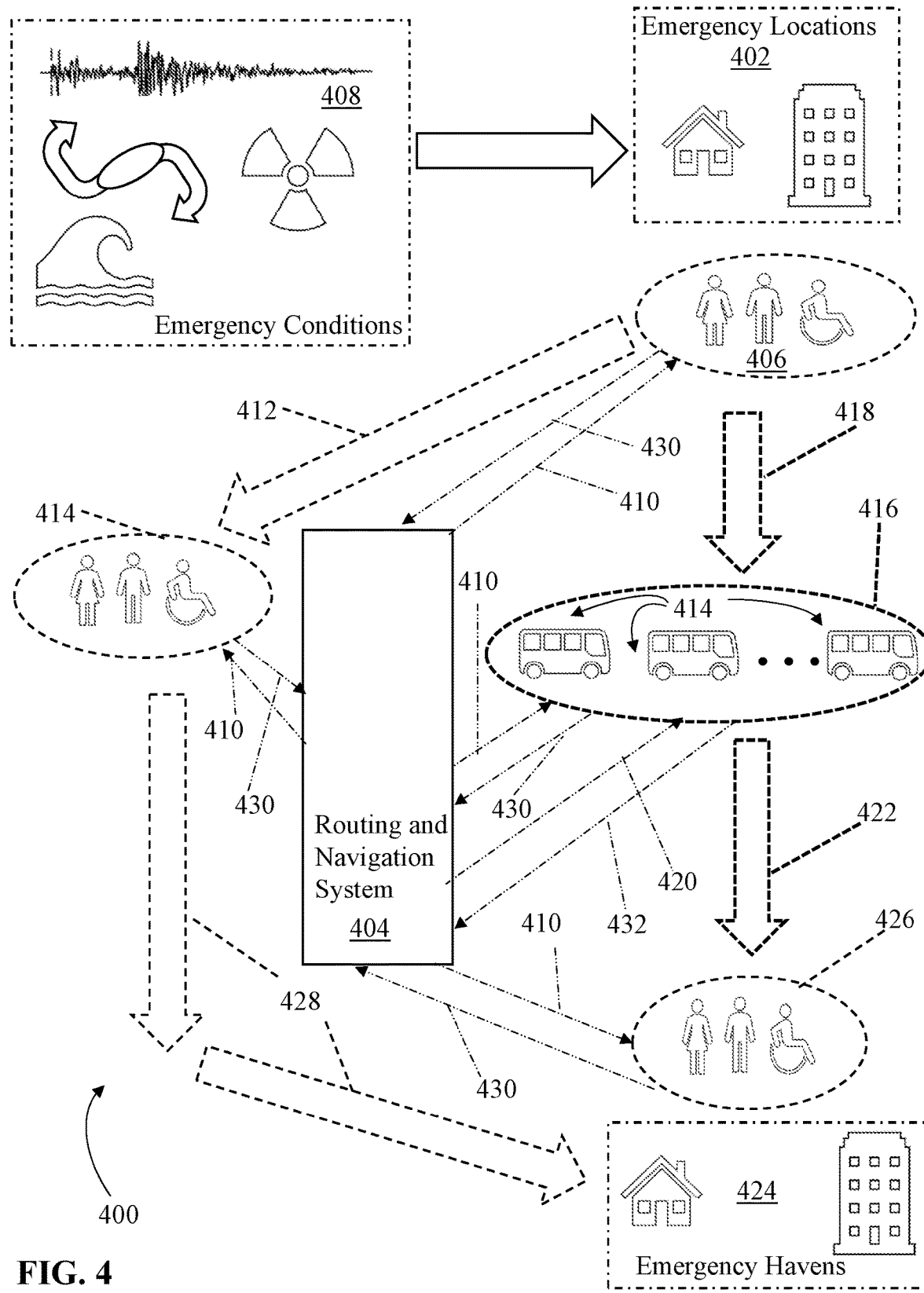
FIG. 4 is a schematic diagram illustrating a relationship between a routing and navigation system and the users and emergency vehicles in communication therewith.

Referring to FIG. 4, a schematic diagram 400 illustrating a relationship between a routing and navigation system and the users and emergency vehicles in communication therewith. Emergency locations 402 are any locations that receive coverage from the routing and navigation system 404 that is substantially similar to the routing and navigation system 100. As used herein, the term "routing" refers to providing the users of routing and navigation system 404 with one or more routes to transit and the term "navigation" refers to the details associated with navigating the provided routes. The emergency locations 402 are any locations that will require an orderly evacuation of a first plurality of users, hereinafter referred to as evacuees 406 in the event of an arrival of emergency conditions 408. The evacuees 406 includes those users not yet beginning to transit to the associated emergency havens 424 from the emergency locations 402. The emergency locations 402 may include, without limitation, residential/suburban areas, urban areas, stadiums, and rural/farm regions, where the population densities of each emergency location 402 will vary with respect to, and without limitation, time of day/week/year, planned events, and the variations naturally expected due to the zoning of the emergency locations 402. The emergency conditions 408 may include, without limitation, seismic events, cyclones (including tornadoes, tropical storms, and hurricanes), tsunamis, and radiation, chemical, and bacteriological releases. The emergency conditions 408 may be naturally-occurring or man-made. In addition, the emergency conditions 408 may be sudden and without warning or tracked for a period of days. Therefore, an evacuation may be scaled along a spectrum that extends form minutes to days. Accordingly, the routing and navigation system 404 is used to evacuate the evacuees 406 for emergency locations 402 that are affected by emergency conditions 408.

The evacuees 406 use one or more of the computing devices 180-190 to communicate with the routing and navigations system 404 to receive updated information with respect to the emergency conditions 408 associated with the emergency locations 402, where such association is at least partially based on the nature of the emergency conditions. The emergency conditions 408 are associated with the emergency locations 402 when the emergency conditions 408 are proximate, near, or within a predefined distance from the emergency locations 402. In addition, the evacuees 406 receive routing and navigation information 410 from the routing and navigation system 404 on portable computing devices 180/184, where the mobile telephone 180 (e.g., smart phones) and the tablet computer 184 will be the most likely instruments of choice by the evacuees 406 during the transit from the emergency locations 402 to the emergency havens 424 due to the near-ubiquitous adoption of these devices, the ease of carrying, and the wireless connectivity.

Depending on factors that include, without limitation, the nature of the emergency conditions 408, the infrastructure, geography, and population of the emergency locations 402, the routing and navigations system 404 generates and transmits to the evacuees 406 a route 412 to navigate without assistance, where the status of the evacuees 406 is changed to a second plurality of users, hereinafter referred to as in transit users 414. The in transit users 414 continue to receive routing and navigation information 410 from the routing and navigation system 404 on portable computing devices 180/184. Accordingly, the transit of the in transit users 414 from the emergency location 402 to an emergency haven 424, on foot or through any motorized device, including, without limitation, bicycles, motorcycles, scooters, personal autos, and mass transit is regulated.

In addition, the conditions may require the routing and navigation system 404 to employ one or more emergency vehicles 416 to more expeditiously transport groups, or pools of the evacuees 406. The routing and navigations system 404 will generate and transmit a route 418 for the evacuees 406 and in transit users 414 to meet up with emergency vehicles 416 that have been individually assigned to each in transit user 414 or group of in transit users 414 such that each in transit user 414 has an assigned emergency vehicle 416. The emergency vehicles 416 receive routing and navigations instructions 420 from the routing and navigations system 404 that, without limitation, include a route 422 to one or more second locations, i.e., emergency havens 424. The in transit users 414 on the emergency vehicles 416 continue to receive routing and navigation information 410 from the routing and navigation system 404 on portable computing devices 180/184. Accordingly, emergency vehicles 416 are employed to transport in transit users 414 from the emergency location 402 to the emergency haven 424 to regulate traffic from the emergency locations 402 to the emergency havens 424.

The route 422 may be changed dynamically depending upon dynamically changing conditions at the emergency locations 402, along the route 422, and at the emergency havens 424. Upon arrival at the emergency havens 424, the in transit users 414 have a status change to a third plurality of users 426, hereinafter referred to as the haven users 426. The haven users 426 continue to receive routing and navigation information 410 from the routing and navigation system 404 on portable computing devices 180/184. For those in transit users 414 that were not directed to the emergency vehicles 416, additional routes 428 are generated and transmitted to each in transit user 414 by the routing and navigation system 404 to route and navigate the in transit users 414 to the emergency havens 424 to mix with the populations of the haven users 426. User feedback signals 430 are continuously transmitted from the portable devices 180/184 of the evacuees 406, the in transit users 414, and the haven users 426. The user feedback signals 430 include, without limitation, responses to interrogatories from the routing and navigation system 404, and global positioning device (GPS) data. In addition, the emergency vehicles 416 transmit feedback 432 to the routing and navigation system 404, such feedback 432 including, without limitation, GPS information. Additional details with respect to the employment of the routing and navigation system 404 to regulate the in transit users 414 and the haven users 426 is described herein with respect to FIG. 5.

Figure 5:
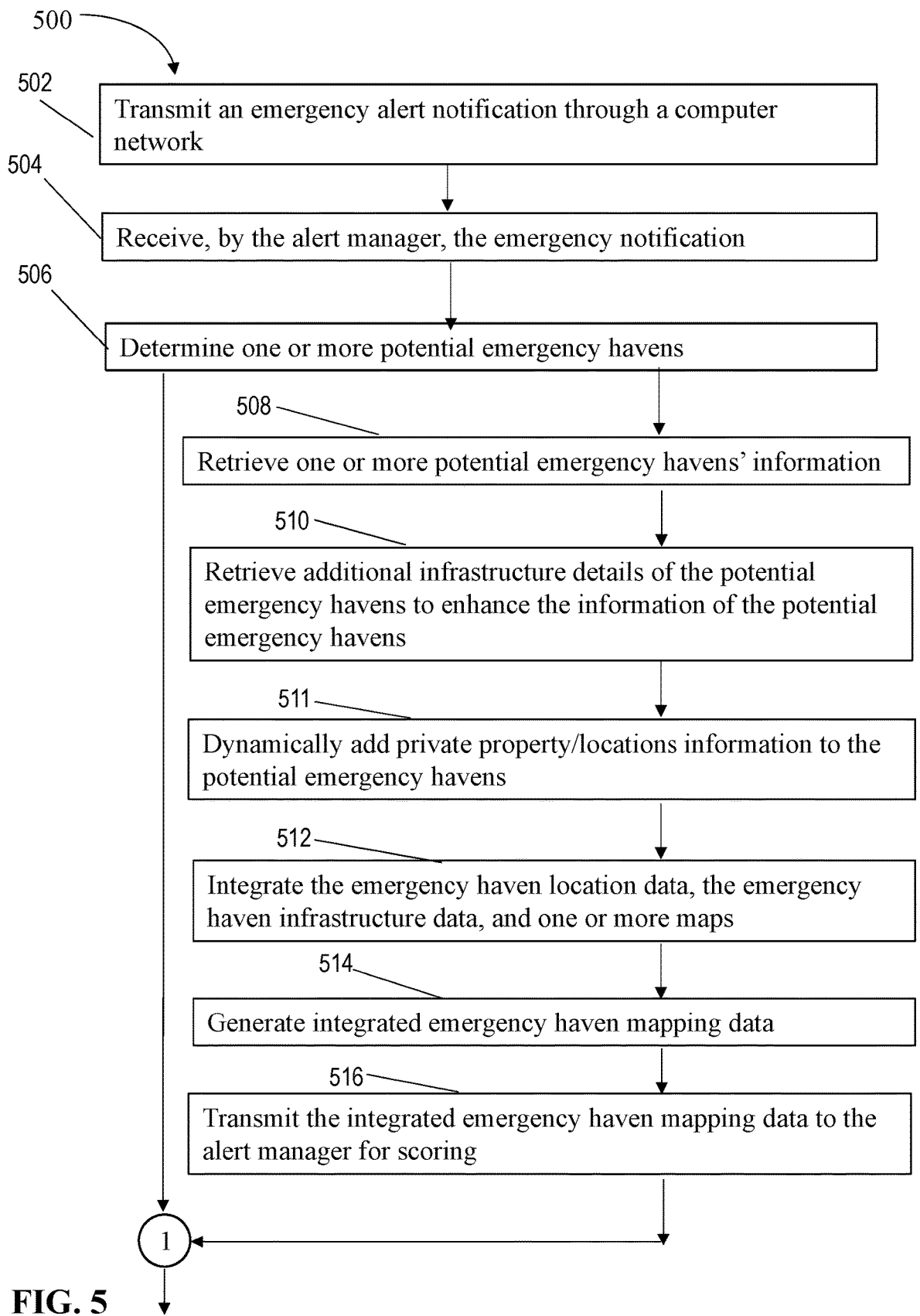
FIG. 5 is a flow chart illustrating a process for providing navigation and transportation to individuals for passage from an emergency-stricken location to an emergency haven, in accordance with some embodiments of the present disclosure.
Figure 5:
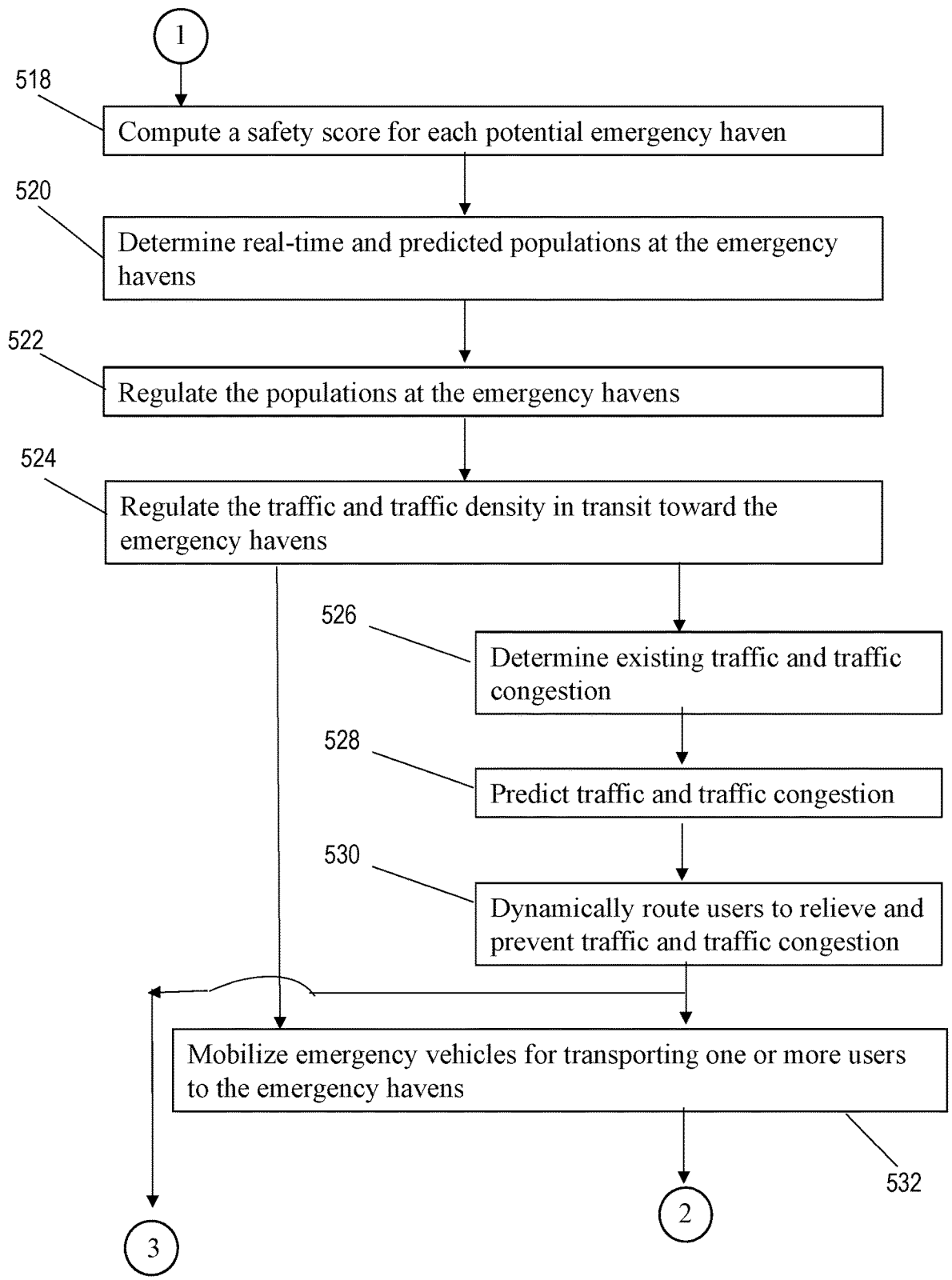
Figure 5:
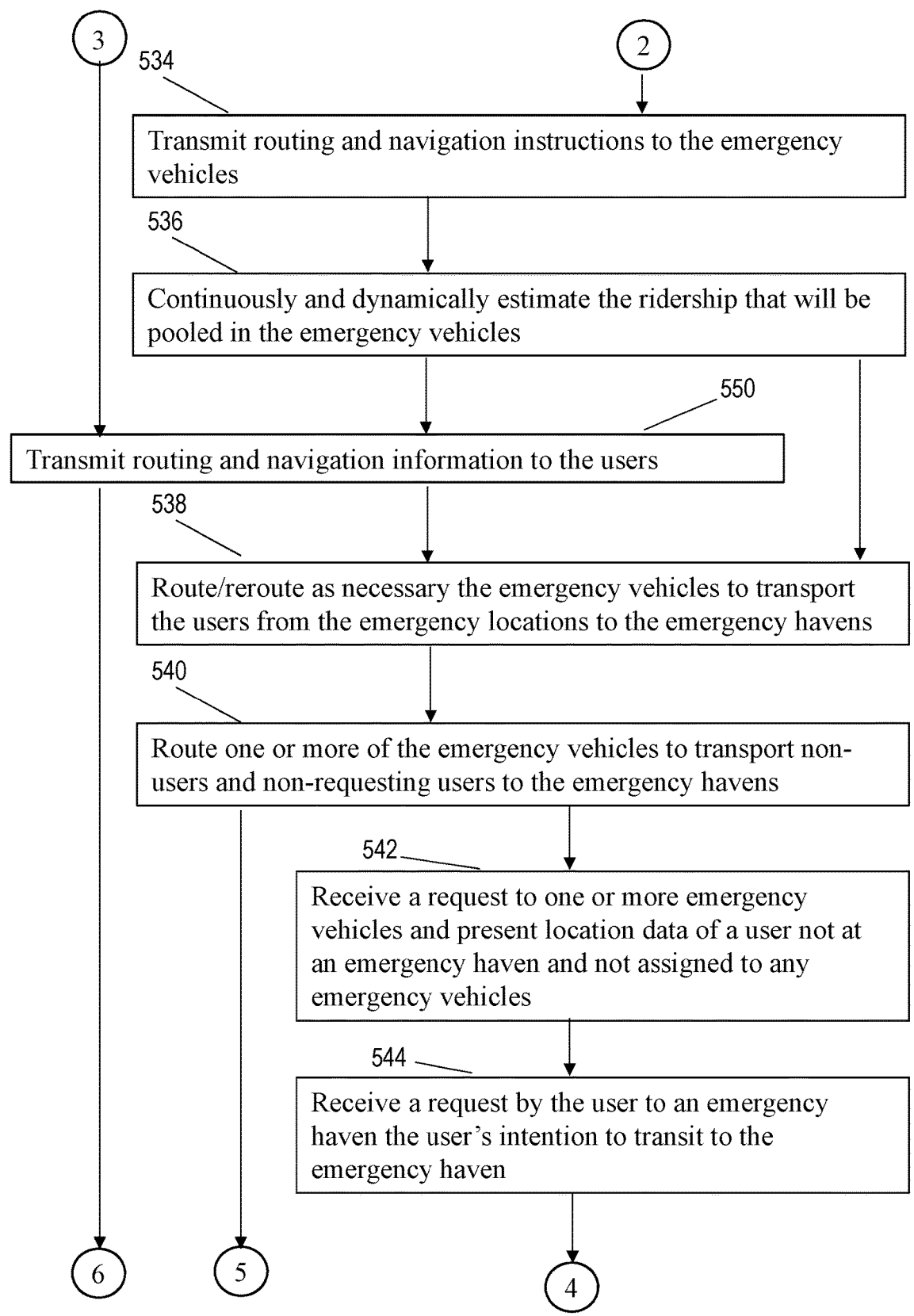
Figure 5:
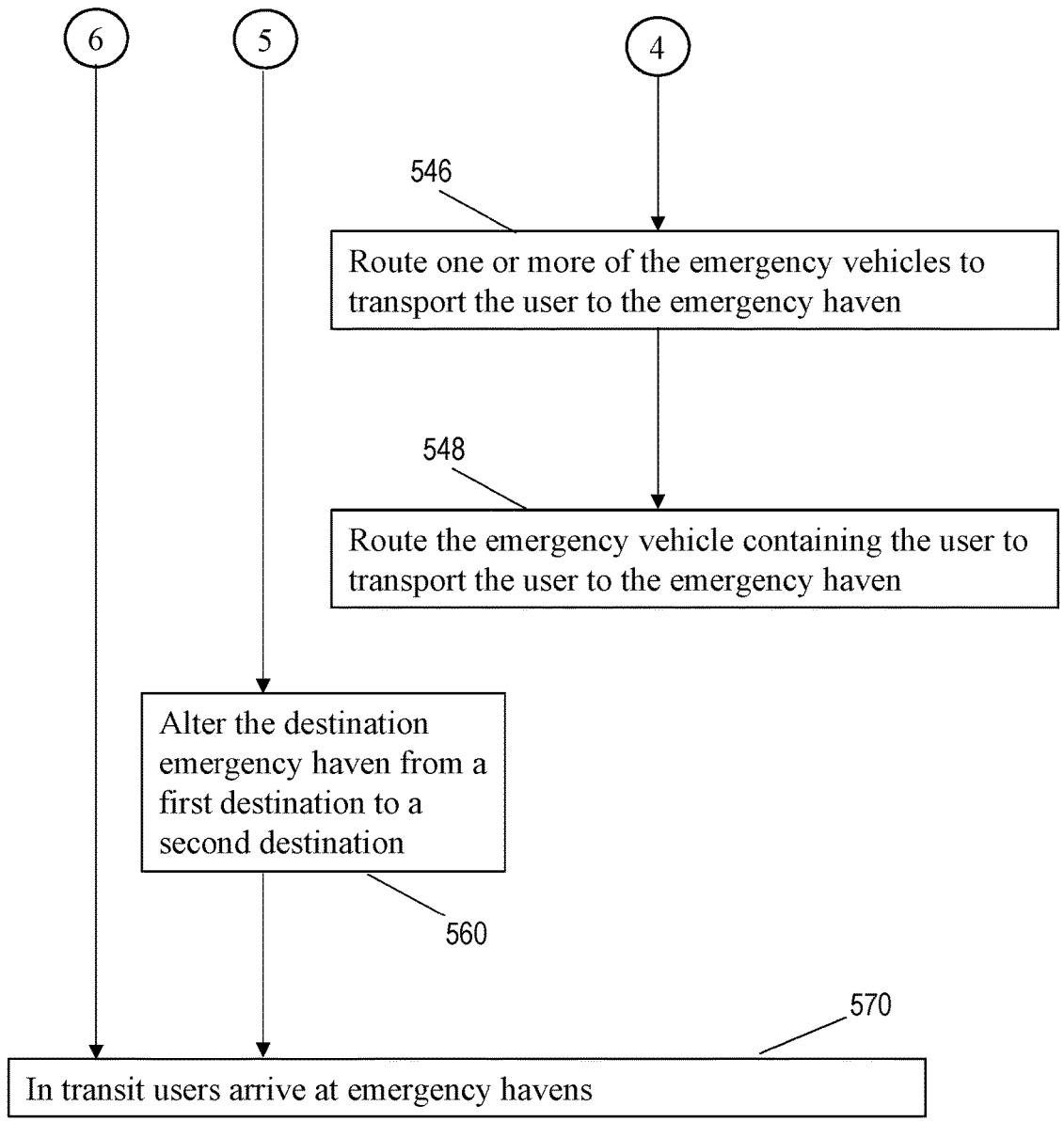

Referring to FIG. 5, a block diagram is provided illustrating a process 500 for providing navigation and transportation to the evacuees 406 for passage from the emergency location 402 to an emergency haven 424. Also referring to FIGS. 1, 2, and 4, one or more emergency alert notifications are transmitted 502 through the computer network connection 105, originating from any one or more of the computing devices 180-190. The emergency alert notifications may originate with one or more of, and without limitation, the National Weather Service and a local emergency broadcast. The emergency alert notification includes information, such as, and without limitation, the affected first location, i.e., an emergency location 402 of the emergency conditions 408 and potential additional affected locations (not shown). The emergency alert notification also includes the type of the emergency conditions 408, such as those listed as emergency conditions 202 in the table 200. In some embodiments, the emergency alert notifications include, without limitation, approximate times such as the remaining time for the emergency conditions 408 to reach the identified emergency location 402, and the amount of time remaining for an individual, i.e., one of the evacuees 406 to reach an emergency haven 424. In at least one embodiment, the emergency alert notification also includes additional information such as, and without limitation, more granular definition and description of the emergency conditions 408, such as the magnitude of the emergency conditions 408, the current location of the emergency conditions 408, and locations to avoid due to the emergency. Accordingly, one or more emergency alert notifications are transmitted through the computer network connection 105, where the notifications include emergency information with respect to physical conditions proximate a first location.

The emergency alert notifications are received 504 by the alert manager 152 from the communications link 102. The alert manager 152 is trained to recognize the emergency alert notifications and initiates an analysis including looking up the safety conditions associated with the reported emergency conditions 408, e.g., the general location conditions data 204 in Table 200 that may provide an emergency haven 424 from the reported type and magnitude of emergency conditions 408 that are either being experienced, or have historically been experienced, in the affected locations by the type and magnitude of the reported emergency conditions 408.

The alert manager 152 communicates with the navigation manager 154 and requests the navigation manager 154 to determine 506 one or more potential emergency havens 424 that meet the criteria associated with the type and magnitude of the reported emergency as determined by the alert manager 152. The navigation manager 154 uses the general location conditions data 204 provided by the alert manager 152 to determine 506 the potential emergency havens 424. Specifically, the navigation manager 154 retrieves 508 particular potential emergency havens 424 based on the general location conditions data 204, an estimated distance to the emergency haven 424 from a particular geographic location, e.g., the emergency location 402 and an estimated time for a user from the evacuees 406 to reach the emergency haven 424 from that particular location. This retrieved data associated with the potential emergency havens 424 is enhanced by the navigation manager 154 through retrieving 510 additional information that includes, without limitation, the number of floors in associated public buildings identified as potential emergency havens 424, the presence of a basement within associated emergency havens 424, the seismic shock resiliency or rating, wall thickness, construction materials, grade above sea level, ventilations systems, and emergency power availability. This additional data is stored in the emergency/haven mapping database 174. Accordingly, the navigation manager 154 includes features that initiates generation potential emergency havens based on the general haven requirements for the type and magnitude of the impending emergency conditions.

In at least some embodiments, the navigation manager 154 is configured to receive updated emergency haven 424 data that includes additional emergency havens 424 to dynamically add 511 to the inventory of emergency havens 424 in the emergency/haven mapping database 174 that are not typically open to the public. For example, in at least some embodiments, users have the ability to dynamically change the status of a private location to an emergency haven 424, to provide safe access for in transit users 414 that may be in the vicinity thereof. Additional features may also include providing the safety features of the private property to the server 110 for storage in the emergency/haven mapping database 174.

In addition, as a portion of the retrieval 510 operation and, in some embodiments, the dynamic addition operation 511, the navigation manager 154 accesses geographic map data that includes one or more maps that are stored in the emergency/haven mapping database 174 and integrates 512 the emergency haven location data and the additional emergency haven infrastructure information with the map data to generate 514 integrated emergency haven mapping data. In at least one embodiment, the map data is received from one or more commercially and/or publicly available mapping systems and applications. In at least one embodiment, the map data includes data representative of features from one or more of, and without limitation, physical maps, road/street/highway maps, topographic maps, time-zone maps, geologic maps, zip code maps, weather maps. The integrated emergency haven mapping data is stored in the emergency/haven mapping database 174, where the integrated emergency haven mapping data will be subject to revision based on real-time emergency and emergency haven information. In at least one embodiment, the navigation manager 154 superimposes the emergency haven location data and the additional infrastructure information over the retrieved map data to generate 514 the integrated emergency haven mapping data. Accordingly, the information determined by the alert manager 152 is enhanced with additional information from the navigation manager 154, where the emergency haven data is integrated with the map data, thereby generating integrated emergency haven mapping data that includes the potential emergency havens 424 and relevant data associated therewith. Accordingly, the navigation manager 154 includes additional features that integrate mapping data with the haven data to generate routing and navigation information to the potential emergency havens.

The navigation manager 154 transmits 516 the integrated emergency haven mapping data to the alert manager 152. The alert manager 152 scores 518, i.e., computes a safety score for each of the potential emergency havens based on the integrated emergency haven mapping data. The computed safety scores are stored in the emergency/haven mapping database 174. In at least one embodiment, the safety score is at least partially based on a scaling of the protective features of the potential emergency havens 424. For example, in at least one embodiment, the scale extends from at least partial protection from the reported emergency conditions 408 to full protection. The distance to the emergency havens 424 and the computed time to arrive at the emergency havens 424 are include in the scoring. Those structures and locations that provide no protection from the reported emergency conditions will not be included in the set of potential emergency havens 424. The computed safety scores are recomputed as the AI platform 150 receives updated information and learns from the new information. Accordingly, each of the potential emergency havens 424 receives a score based on the level of protection expected against the reported emergency conditions determined from the integrated emergency haven mapping data, which includes the approximate time it will take a user from the evacuees 406 and the in transit users 414 to traverse the calculated distance.

The alert manager 152 communicates with the population database 176 for determining 520 real-time populations and predicted populations of people, i.e., haven users 426 at each of the emergency havens 424. The alert manager 152 leverages the data associated with, and without limitation, the population capacity of each emergency haven 424, historical populations and population densities for each emergency haven 424 for each emergency condition 408 (locally and more broadly associated with other geographic locations with similar conditions using similarly configured emergency havens 424), the predicted populations and population densities of haven users 426 at each emergency haven 424, predicted changes in populations of haven users 426 at each emergency haven 424 as a function of real-time feedback of the number of in transit users 414 that selected, or are directed toward, the respective emergency havens 424, and actual real-time changes in the population of haven users 426 at each emergency haven 424 through feedback from an arrival at each emergency haven 424 of the in transit users 414. In at least one embodiment, the alert manager 152 communicates with the navigation manager 154 to determine the estimated time that it will take for the in transit users 414 to reach the respective emergency haven 424. The predicted populations of the haven users 426, and the methodology and algorithms to generate the predictions, at each of the emergency havens 424 are modified as the AI platform 150 receives updated information and learns from the new information. Accordingly, the populations of the haven users 426 congregating at the emergency havens 424 are actively and dynamically regulated.

In at least one embodiment, the populations and population densities of individuals that are not users of the routing and navigation system 404 are estimated through data that includes, without limitation, real-world updates from users of the routing and navigation system 404 resident in the emergency havens 424 and statistical estimations based on historical data. The population database 176 is updated in real-time through information transmitted from the one or more of the computing devices 180-190 across the computer network connection 105. In at least one embodiment, an in transit user 414 may monitor the population and population density of haven users 426 at the respective emergency haven 424 as the in transit user 414 progresses to the respective emergency haven 424. In at least one other embodiment, the routing and navigation system 404 may provide the in transit user 414 transiting toward the associated emergency haven 424 with real-time populations and population densities of haven users 426 at the emergency haven 424. Also, in some embodiments, the routing and navigation system 404 may provide the in transit user 414 transiting toward the associated emergency haven 424 with estimated populations and population densities of haven users 426 at the emergency haven 424 that will be present when the in transit user 414 arrives. The predicted populations of emergency havens 424, and the methodology and algorithms to generate the predictions, are modified as the AI platform 150 receives updated information and learns from the new information. Accordingly, the alert manager 152 regulates 522 the populations and population densities of haven users 426 at the emergency havens 424.

The alert manager 152 facilitates regulating 524 the traffic and traffic density of in transit users 414 toward each of the emergency havens 424. The alert manager 152 leverages the data resident within the traffic congestion database 178 as discussed herein and real-time data received from the users of the routing and navigation system 404, such as, and without limitation, the evacuees 406, the in transit users 414, the present locations of the in transit users 414, and the haven users 426. Through this data, the alert manager 152 determines 526 the traffic and traffic densities of the in transit users 414 to the emergency havens 424, and predicts 528 the traffic and traffic densities along the associated thoroughfares. The alert manager 152 also receives data such as known speed limits and traffic signals on the thoroughfares that include routes 412, 418, 422, and 428 to facilitate the traffic congestion predictions 528. Accordingly, the alert manager 152 predicts 528 routes prone to congestion subject to one or more of historical data from the traffic congestion database 178 and real-time tracking of the in transit users 414.

The traffic congestion database 178 includes data associated with, and without limitation, a traffic capacity of each thoroughfare that users of the routing and navigation system 100 may use to transit from the emergency location to the emergency haven, historical traffic conditions including traffic densities expected for similar days and times without an emergency for establishing baseline conditions, historical optimized traffic routing in previous similar emergency conditions along the associated thoroughfares, historical traffic and traffic density for each emergency recorded locally and more broadly associated with other geographic locations with similar conditions using similarly configured geographies, the predicted traffic and traffic densities and the expected changes between the affected areas and the emergency havens at least partially as a function of the users routed by the routing and navigation system 100, real-time feedback of the number of in transit users directed toward the respective emergency havens, and actual real-time changes in the population at each emergency haven through feedback from an arrival at each second location of the in transit users, and those users that have not started but will be routed through the associated thoroughfares. The use of the aforementioned data is discussed further herein with reference to FIGS. 4 and 5.

The alert manager 152 has sufficient data to determine the existing traffic and traffic densities and anticipate traffic congestion along the thoroughfares, and in at least some embodiments, dynamically routes 530 the in transit users 414 to relieve existing traffic congestion and to prevent future traffic congestion, such as, and without limitation, routing in transit users 414 away from anticipated congestion as discussed further herein. In at least some embodiments, the alert manager 152 has access to real-time information with respect to traffic congestion based on slowing moving vehicles, disabled vehicles, etc. The predicted traffic and traffic congestion and the dynamic routing of the in transit users 414, as well as the methodology and algorithms to generate the predictions, are modified as the AI platform 150 receives updated information and learns from the new information. Accordingly, the alert manager 152 generates a predicted traffic density of the in transit users 414 to each emergency haven 424, and dynamically regulates the predicted traffic density of the in transit users 414 through routing and rerouting the in transit users 414 of the routing and navigation system 404.

In at least some embodiments, in order to relieve or prevent traffic congestion, the alert manager 152 directs one or more subsets of users, i.e., at least a portion of the evacuees 406 and in transit users 414 into one or more groups that may share assigned vehicles, e.g., one or more carpools assembled by the routing and navigation system 404. In such embodiments, each of the in transit users 414 are directed to a unique predetermined emergency vehicle 416. In at least some other embodiments, a fleet of emergency vehicles 416 are available for transporting multiple in transit users 414 to the designated emergency havens 424. In at least one embodiment, the emergency vehicles 416 are vehicle transports driven by a human driver that receives routing and navigation instructions 420 through the routing and navigation system 404. In other embodiments, the emergency vehicles 416 are autonomously driven and are routed through the routing and navigation system 404. Accordingly, the emergency vehicles 416 are in operable communication with the routing and navigation system 404.

In at least one embodiment, the emergency vehicles 416 are equipped with one or more of computing devices 180, 184, and 186 to communicate with the server 110 and knowledge base 170. In at least some of those embodiments, operation of such computing devices 180, 184, and 186 is achieved through a human driver. In other embodiments, on-board computing devices (not shown) are installed on the emergency vehicles 416.

The alert manager 152 mobilizes 532 the emergency vehicles 416 for transporting one or more in transit users 414 to the emergency havens 424. The alert manager 152 transmits 534 routing and navigation instructions 420 to the emergency vehicles 416. The routing and navigation instructions 420 are used to collect users from the evacuees 406 and in transit users 414 and transport them to the associated emergency haven 424 within the time frame determined by the alert manager 152 to mitigate exposure of the users to the emergency conditions 408. The routing and navigation system 404 continuously and dynamically estimates 536 the ridership that will be pooled in the emergency vehicles 416 to calculate the number of emergency vehicles 416 that are to be made available and a schedule for routing the emergency vehicles 416. In at least one embodiment, the emergency vehicles 416 will be routed 538 and rerouted as necessary to transport the in transit users 414 from the emergency locations 402 to the emergency havens 424 in real-time based on factors that include, without limitation, changing conditions of the emergency conditions 408 and/or the emergency locations 402, a change in the populations of the evacuees 406 and the in transit users 414, the populations of the in transit users 414 at the emergency havens 424 approaching known capacity, adding and removing stops along the route 422 which may, or may not, be requested by the evacuees 406 and in transit users 414, while still maintaining an arrival at the scheduled emergency havens 424 within the prescribed time period. Accordingly, each emergency vehicle 416, as a portion of a plurality of emergency vehicles 416, is routed 538 to facilitate reducing a potential for traffic congestion on the selected routes 418 and 422 for the emergency vehicles 416. In addition, accordingly, such routing 538 of electric vehicles 416 facilitates reducing a potential for traffic congestion on the routes 412 and 428 not being used by the emergency vehicles 416 by transporting the in transit users 414 that would otherwise contribute to traffic congestion on the routes 412 and 428.

In at least some embodiments, one or more emergency vehicles 416 are routed 540 through thoroughfares as directed by the routing and navigation system 404 to provide transportation to the emergency havens 424 to non-users and non-requesting users of the routing and navigation system 404 to attempt to transport them to the emergency havens 424 within the prescribed period time while attempting avoidance of the emergency conditions 408. The routing and navigation system 404 maintains a record of known and registered users, and therefore tracks which registered users are being routed to the emergency havens 424 and those that are not and makes an attempt to locate the presently unlocated users. The non-requesting users include, without limitation, users with their portable computing device 180/184 deenergized, however their movements for a particular time of day are maintained in the population database 176, and the emergency vehicles 416 are routed to the associated vicinities. The non-requesting users may also include, without limitation, those users with their portable computing devices 180/184 energized, where the user is unaware of the routing and navigation information 410 from the routing and navigation system 404, however the routing and navigation system 404 continues to track such users through the global positioning system (GPS) features of the device 180/184. Accordingly, one or more of the emergency vehicles 416 is assigned to find and transport people not previously assigned to a unique predetermined emergency vehicle 416.

In at least one embodiment, one or more of the emergency vehicles 416 are configured to receive 542 a first transmission from a user. In one embodiment, the user is an evacuee 406 that has not yet initiated the transit to an emergency haven 424. In another embodiment, the user is an in transit user 414 that has not yet been assigned to an emergency vehicle 416, yet requires an emergency vehicle 416 to reach the nearest and most appropriate emergency haven 424 within the within the time constraints dictated by the emergency conditions 408. In some embodiments, the user is stranded at either the emergency location 402 or along the routes 412 and 428. In some other embodiments, the user was assigned to an emergency vehicle 416, but, for any reason, did not reach the assigned emergency vehicle 416 in time and is now stranded along the route 418. In some further embodiments, the user was assigned to an emergency vehicle 416 and, for any reason, exited the emergency vehicle 416 and is now stranded along the route 422. The user employs a wireless device such as a mobile phone 180 or an tablet 184 to contact an emergency vehicle 416 through either the server 110 or directly through a low-power, wide-area network (LPWAN) (discussed further herein). The first transmission from the user includes the request and present location information.

The user will also send a second transmission to one or more emergency havens 424 that is received 544 by at least one of the one or more of the emergency havens 424. The second transmission includes a request to use one of the emergency havens 424 reachable by transit through an emergency vehicle 416 within the time constraints dictated by the emergency conditions 408. The user employs the associated wireless device to contact the emergency haven(s) 424 through either the server 110 or directly through the LPWAN. An available emergency vehicle 416 that can meet the time constraints will be routed 546 toward the user at the transmitted location. In some embodiments, an emergency vehicle 416 already transiting toward the associated emergency haven 424 will pick up the stranded user. In some other embodiments, one of the emergency vehicles 424 employed for picking up non-users and non-requesting users as described elsewhere herein is employed for the stranded user. Once the user boards the emergency vehicle 416, the emergency vehicle 416 is routed 548 to transport the user to the associated emergency haven 424.

In at least some embodiments, the in transit users 414 and the driver (human or autonomous) of the emergency vehicle 416 may be permitted to alter 560 the destination emergency haven 424 from a first destination to a second destination while the emergency vehicle 416 is already transiting to the first destination. Under such circumstances, the routing and navigation system 404 will evaluate the alternative destination emergency havens 424 subject to conditions that include, without limitation, the safety scoring (per the scoring operation 518) of the emergency havens 424 and present and predicted populations and population densities of the alternative emergency havens 424. The change in the destination emergency haven 424 will be fed-back to the routing and navigation system 404 such that the predicted populations of the previous and the current emergency havens 424 are updated accordingly. The data associated with the routing of the in transit users 414 and the emergency vehicles 416, including any rerouting and alterations, is collected and the methodology and algorithms to generate the routes are modified as the AI platform 150 receives updated information and learns from the new information.

Once the routing and navigation system 404 begins to dynamically route 530 the evacuees 406 and the in transit users 414 and estimating 536 the ridership for the emergency vehicles 416, the alert manager 152 begins to transmit 550 routing and navigation information to the evacuees 406. In at least some embodiments, the alert manager 152 transmits preliminary warnings and advisories to the evacuees 406 in advance of the routing and navigation information to prepare the evacuees 406 appropriately. The routing and navigation information includes, without limitation, details of the emergency conditions 408, maps of the emergency locations 402, selected emergency havens 424 with computed safety scores that exceed a predetermined threshold including the scores and the associated safety features, the best routes to navigate, the routes and areas to avoid, the predicted travel times for each route, and present and predicted populations and capacities of the emergency havens 424. The areas to avoid include, without limitation, emergency havens 424 and routes 412, 418, 422, and 428 that have been determined to be unavailable. In at least some embodiments, the unavailable emergency havens 424 and routes 412, 418, 422, and 428 include, without limitation, those emergency havens 424 that have the necessary safety features but are too close to the emergency conditions 408. The unavailable emergency havens 424 and routes 412, 418, 422, and 428 also include, without limitation, the emergency havens 424 and routes 412, 418, 422, and 428 that are predicted to not be able to withstand the arrival of the emergency conditions 408 based on the timing and magnitude thereof. Accordingly, the in transit users 414 are routed away from, or around, unavailable emergency havens 424 and routes 412, 418, 422, and 428.

For certain conditions where pooling with the emergency vehicles 416 is the best option for transporting the expected number of the evacuees 406, the routing and navigation information will also include the identification of the assigned emergency vehicle 416. The routing and navigation information also includes alerts for situations where none of the emergency havens 424 can be reached in the allotted time. Specifically, the alerts identify emergency havens 424 that may not meet all of the haven requirements for the particular emergency conditions 408, where the predicted population may exceed the rated capacity, and routes that are predicted to be problematic for timely traversal.

As the conditions of the emergency conditions 408, the emergency locations 402, the emergency havens 424, and the routes 412, 418, 422, and 428 therebetween change, the updated information is dynamically transmitted to the evacuees 406, the in transit user 414, and the haven users 426. In addition, the routing and navigation system 404 continuously receives user feedback signals 430 and emergency vehicle feedback 432 to track any issues encountered by the users which navigating, such as multiple re-routes in a particular route which would indicate a problem with the route. The information recorded by the routing and navigation system 404 in real-time will be used to further train the AI platform 150 to apply to in transit users 414 that have not yet reached the affected portions of the problematic routes. Once the transmit operation 550 is executed, thereby transmitting the routing and navigation information to the evacuees 406, the route/reroute operation 538, the routing operation 540, and the alter operation 560, all as described elsewhere herein, are initiated.

In at least one embodiment, each user from the evacuees 406 will have an option to select the emergency haven 424. In at least one of those embodiments, the routing and navigation system 404 has the capability to override a user's selection. In at least one other embodiment, the routing and navigation system 404 selects the emergency haven 424 for all users. In at least one further embodiment, the emergency havens 424 are selected through a combination of user selections and system selection.

During the execution of the transmit operation 550, the routing and navigation system 404 continuously updates and adds to the data resident in the library 172. In addition, the routing and navigation system 404 synchronizes at least a portion of this data with computing devices 180/184 of the evacuees 406, the in transit users 414, and the haven users 426. The synchronized information includes, without limitation, map data, routing directions, population (actual and predicted) of the associated emergency haven 424, and status of the emergency conditions 408. Also, in some embodiments, the routing and navigation system 404 uses Wi-Fi network, Internet, and GPS connectivity, and if that connectivity is interrupted, the routing and navigation system 404 shifts to a low-power, wide-area network (LPWAN). In addition, the emergency havens 424 and the emergency vehicles 416 will include transmitters operating within the LPWAN frequency range to transmit information related to the emergency havens 424 to the evacuees 406, the in transit users 414, and the haven users 426, such as, without limitation, shelter status, location, and population data. In at least some embodiments, the evacuees 406, the in transit users 414, and haven users 426 may also transmit information from the devices 180/184 of the in transit users 414 that are not on an emergency vehicle 416 through the LPWAN to nearby emergency havens 424 and emergency vehicles 416 such that arrangements for a pickup by the emergency vehicles 416 may be made. The server 110 will determine the nearest emergency vehicle 416 and emergency haven 424 for such affected in transit users 414. Accordingly, in the event of a loss of network and Internet communications during the emergency, a backup communications network is available to provide at a least a portion of the features to the users to evacuate the emergency locations and transit toward the emergency havens.

The in transit users 414 arrive 570 at the emergency havens 424 and in at lease some embodiments, the in transit users 414 mark their arrival to the server 110 through their computing devices 180/184 and the in transit users 414 have a status change to the haven users 426. The population database 176 is updated for the arrival of the in transit users 414 at the emergency havens 424. In other embodiments, the arrival of the in transit users 414 at the emergency havens 424 results in an automated check-in of the haven users 426 by the emergency haven 424. Accordingly, the in transit users 414 check-in to the emergency havens 424 and their status is updated to reflect their joining the population at the emergency haven 424. Once a load of in transit users 414 are released from the emergency vehicles 416 to the emergency havens 424, the emergency vehicles 416 are directed to the next route by the server 110 to collect additional users.

As described elsewhere herein, the in transit users 414 may experience difficulties in arriving at the respective emergency havens 424 and the emergency vehicles 416 receive routing and navigation instructions 420 that include, without limitation, the location of the pickup, the route to the pickup point, who to pick up, the estimated time of the pickup, and the estimated time to the emergency haven 424 from pickup.

In at least some embodiments, the alert manager 152 determines a real-time population of the skills, occupations, and certifications of haven users 426 at each emergency haven 424. In addition, the alert manager 152 determines a population of the skills, occupations, and certifications of the in transit users 414. In some embodiments, the skills include those skills typically known to be useful in the event of an emergency, including, without limitation, first-aid, cardio-pulmonary resuscitation (CPR), nursing, and doctoring skills. Accordingly, for each emergency haven 424, a forecasted population of the skills, occupations, and certifications of haven users 426 is determined.

Accordingly, the integration of the features of the alert manager 152 and the navigation manager 154 results in a practical application of an improvement to the functioning of the associated computing systems, and specifically, the routing and navigation features of the computing systems.

Figure 6:
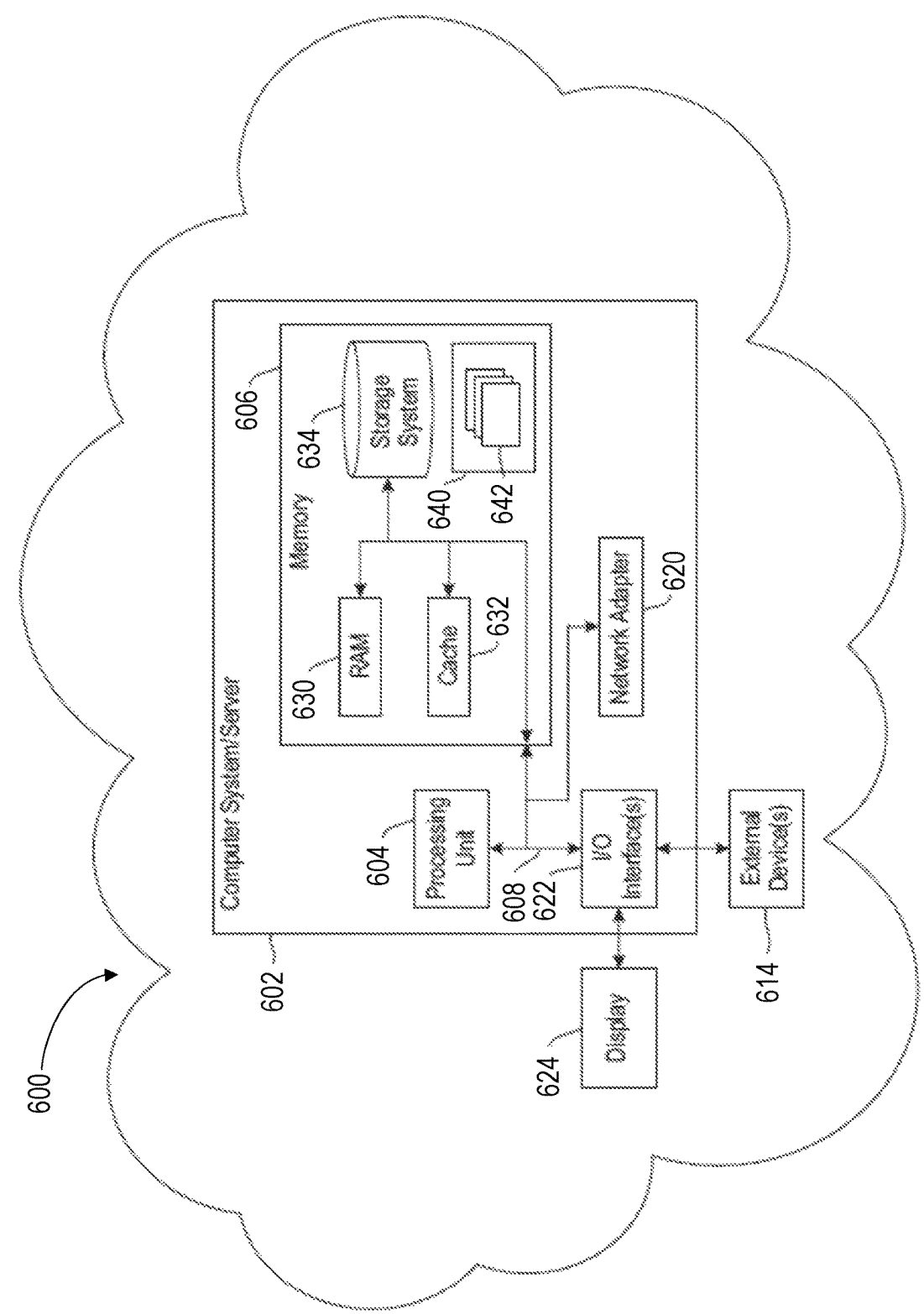
FIG. 6 is a block diagram illustrating a computer system/server of a cloud-based support system, to implement the processes described above with respect to FIGS. 1-5, in accordance with some embodiments of the present disclosure.

Aspects of the alert manager 152 and the navigation manager 154 may be embodied in a computer system/server in a single location, or in at least one embodiment, may be configured in a cloud-based system sharing computing resources. With reference to FIG. 6, a block diagram is provided illustrating an example of a computer system 600 including a computer/server 602, hereinafter referred to as a host 602 in communication with a cloud based support system, to implement the system, tools, and processes described above with respect to FIGS. 1-5. Host 602 is operational with numerous other general purpose or special purpose computer system environments or configurations. Examples of well-known computer systems, environments, and/or configurations that may be suitable for use with host 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 602 may be described in the general context of computer system-executable instructions, such as program modules, being executed by a computer system. Generally, program modules may include routines, programs, objects, components, logic, data structures, and so on that perform particular tasks or implement particular abstract data types. Host 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, host 602 is shown in the form of a general-purpose computing device. The components of host 602 may include, but are not limited to, one or more processors or processing devices 604, e.g. hardware processors, a system memory 606, and a bus 608 that couples various system components including system memory 606 to the processing device 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 602 typically includes a variety of computer system readable media. Such media may be any available media that is accessible by host 602 and it includes both volatile and non-volatile media, removable and non-removable media.

Memory 606 can include computer system readable media in the form of volatile memory, such as random access memory (RAM) 630 and/or cache memory 632. By way of example only, a storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces.

Program/utility 640, having a set (at least one) of program modules 642, may be stored in memory 606 by way of example, and not limitation, as well as an operating system, one or more application programs, other program modules, and program data. Each of the operating systems, one or more application programs, other program modules, and program data or some combination thereof, may include an implementation of a networking environment. Program modules 642 generally carry out the functions and/or methodologies of embodiments to dynamically capture environmental configuration changes related to applications such that application-level recoveries may be performed from enterprise-level image copy backups. For example, the set of program modules 642 may include the alert manager 152 and the navigation manager 154 as described in FIGS. 1-5.

Host 602 may also communicate with one or more external devices 614, such as a keyboard, a pointing device, etc.; a display 624; one or more devices that enable a user to interact with host 602; and/or any devices (e.g., network card, modem, etc.) that enable host 602 to communicate with one or more other computing devices. Such communication can occur via Input/Output (I/O) interface(s) 622. Still yet, host 602 can communicate with one or more networks such as a local area network (LAN), a general wide area network (WAN), and/or a public network (e.g., the Internet) via network adapter 620. As depicted, network adapter 620 communicates with the other components of host 602 via bus 608. In at least one embodiment, a plurality of nodes of a distributed file system (not shown) is in communication with the host 602 via the I/O interface 622 or via the network adapter 620. It should be understood that although not shown, other hardware and/or software components could be used in conjunction with host 602. Examples, include, but are not limited to: microcode, device drivers, redundant processing devices, external disk drive arrays, RAID systems, tape drives, and data archival storage systems, etc.

In this document, the terms "computer program medium," "computer usable medium," and "computer readable medium" are used to generally refer to media such as main memory 606, including RAM 630, cache memory 632, and storage system 634, such as a removable storage drive and a hard disk installed in a hard disk drive.

Computer programs (also called computer control logic) are stored in memory 606. Computer programs may also be received via a communication interface, such as network adapter 620. Such computer programs, when run, enable the computer system to perform the features of the present embodiments as discussed herein. In particular, the computer programs, when run, enable the processing device 604 to perform the features of the computer system. As such, computer programs may represent controllers of the computer system. Accordingly, the functionality for the alert manager 152 and the navigation manager 154, as described in FIGS. 1-5, is embodied as computer program code stored in memory 606 (in some embodiments as program modules 642), where the computer program code includes the instructions to be executed by the processing device 604 to provide at least a portion of the functionality of the alert manager 152 and the navigation manager 154 as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. Accordingly, the functionality for the alert manager 152 and the navigation manager 154, as described in FIGS. 1-5, may be embodied as computer readable program instructions to be executed by one or more hardware devices other than, or in addition to, the processing device 604 to provide at least a portion of the functionality of the alert manager 152 and the navigation manager 154 as described herein.

In at least one embodiment, host 602 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
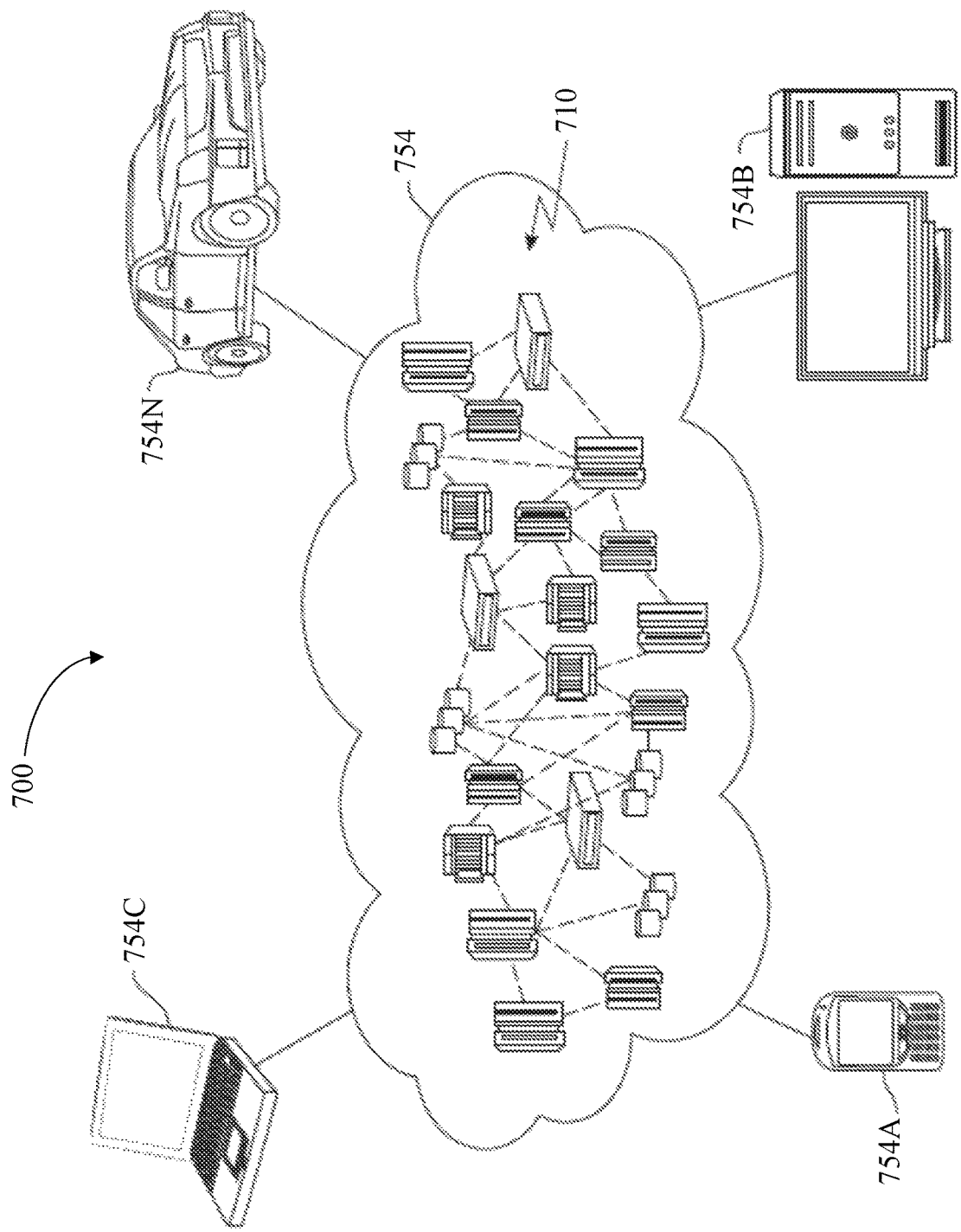
FIG. 7 is a schematic diagram illustrating a cloud computer environment, in accordance with some embodiments of the present disclosure.

Referring now to FIG. 7, a schematic diagram is provided illustrating an example cloud computing network 700. As shown, cloud computing network 700 includes a cloud computing environment 750 having one or more cloud computing nodes 710 with which local computing devices used by cloud consumers may communicate. Examples of these local computing devices include, but are not limited to, personal digital assistant (PDA) or cellular telephone 754A, desktop computer 754B, laptop computer 754C, and/or automobile computer system 754N. Individual nodes within nodes 710 may further communicate with one another. They may be grouped (not shown) physically or virtually, in one or more networks, such as Private, Community, Public, or Hybrid clouds as described hereinabove, or a combination thereof. This allows the cloud computing network 700 to offer infrastructure, platforms and/or software as services for which a cloud consumer does not need to maintain resources on a local computing device. It is understood that the types of computing devices 754A-N shown in FIG. 7 are intended to be illustrative only and that the cloud computing environment 750 can communicate with any type of computerized device over any type of network and/or network addressable connection (e.g., using a web browser).

Figure 8:
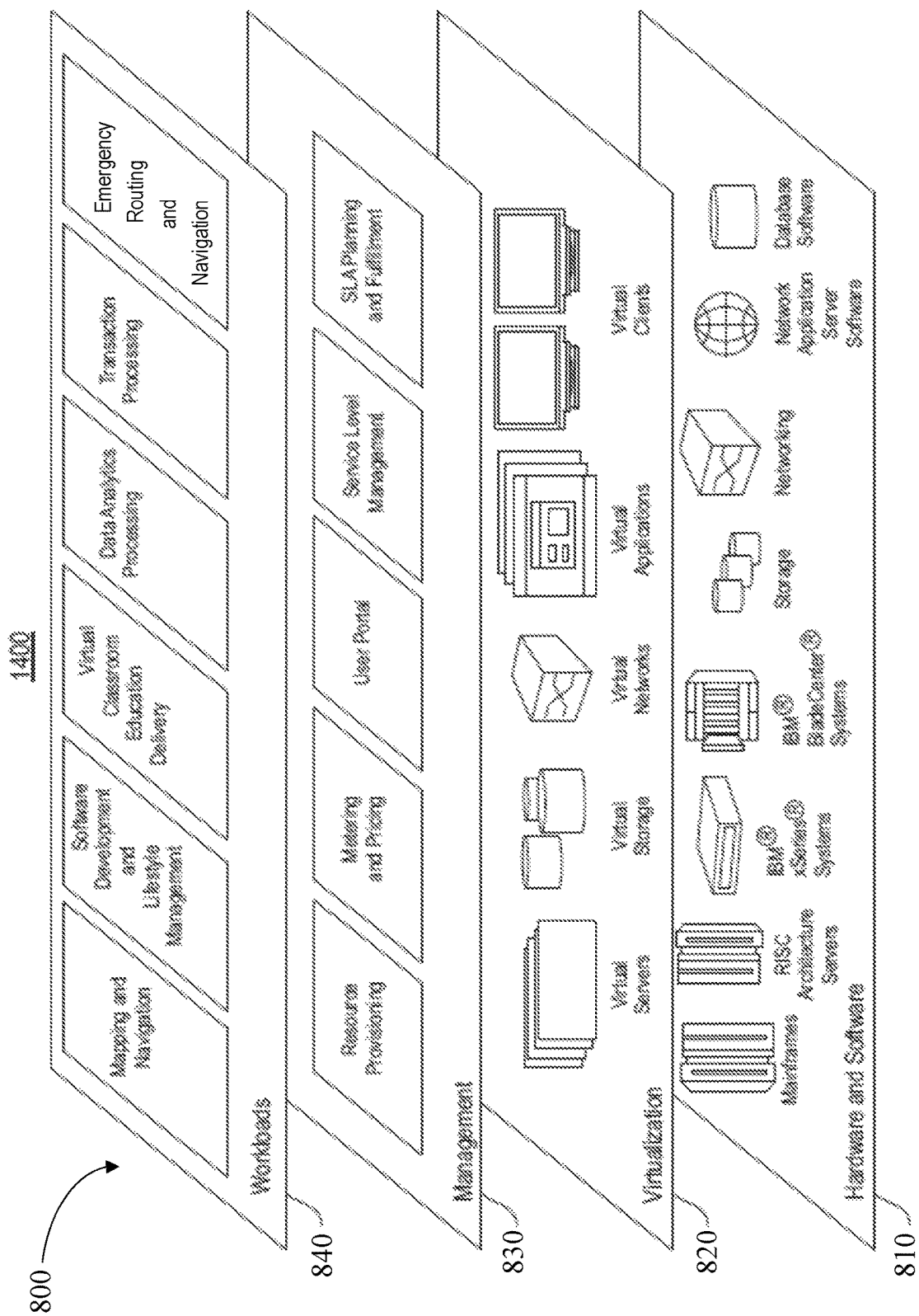
FIG. 8 is a block diagram illustrating a set of functional abstraction model layers provided by the cloud computing environment, in accordance with some embodiments of the present disclosure.

Referring now to FIG. 8, a set of functional abstraction layers 800 provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer 810, virtualization layer 820, management layer 830, and workload layer 840.

The hardware and software layer 810 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 820 provides an abstraction layer from which the following examples of virtual entities may be provided: virtual servers; virtual storage; virtual networks, including virtual private networks; virtual applications and operating systems; and virtual clients.

In one example, management layer 830 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and emergency routing and navigation.

It will be appreciated that there is disclosed herein a system, method, apparatus, and computer program product for routing and providing navigation to users to transit from and emergency location to an emergency haven efficiently and within an optimal time frame.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
   a processing device; and
   an artificial intelligence (AI) platform comprising:
      an alert manager configured to:
         transmit, to a first plurality of users, at the one or more first locations, at least one notification, wherein the at least one notification is initiated at least partially due to one or more first physical conditions associated with the one or more first locations; a navigation manager configured to:
         determine the one or more second locations, the one or more second locations different from the one or more first locations, wherein each second location of the one or more second locations is determined to provide at least partial protection from the first physical conditions associated with the one or more first locations; and
      the alert manager further configured to:
         dynamically regulate traffic of a second plurality of users from the one or more first locations to the one or more second locations, wherein the second plurality of users includes at least a portion of the first plurality of users in transit to the one or more second locations.

2. The system of claim 1, wherein the alert manager is further configured to:
   regulate one or more emergency vehicles designated for transport of the second plurality of users to each second location, comprising:
      pool one or more subsets of the second plurality of users, wherein each subset of the one or more subsets is assigned to a unique predetermined emergency vehicle;
      route each user of each subset of the second plurality of users to the unique predetermined emergency vehicle;
      assign the one or more emergency vehicles to transport people not assigned to the unique predetermined emergency vehicle; and
      route each emergency vehicle to reduce a potential for traffic congestion.

3. The system of claim 1, the alert manager is further configured to:
   predict routes prone to congestion, subject to one or more of historical route congestion data and real-time tracking of the second plurality of users; and
   determine unavailable routes and direct the second plurality of users around the unavailable routes.

4. The system of claim 1, further comprising a plurality of wireless devices in operable communication with the processing device, the alert manager is further configured to:
   generate one or more predicted traffic densities between the one or more first locations to the one or more second locations, at least a portion of the second plurality of users in possession of at least one of the one or more wireless devices;
   transmit, to the second plurality of users, routing information from the one or more first locations to the one or more second locations, wherein the routing information is subject to the one or more predicted traffic densities and a dynamic regulation of one or more real-time traffic densities;
   record, for each second location, a real-time population of a third plurality of users;
   receive, from each user of the second plurality of users in possession of at least one of the one or more wireless devices and directed toward a respective second location, a real-time location thereof;
   determine, subject to a measured rate of progress of each user of the second plurality of users, a time period for each user of the second plurality of users to arrive at a selected second location; and
   determine, for each second location, a predicted population.

5. The system of claim 4, the alert manager is further configured to:
   dynamically regulate the population of the third plurality of users at each second location subject to one or more of:
      the predicted population at each second location; and
      a population capacity of each second location, the alert manager is further configured to:
         record an arrival of each user of the second plurality of users at each second location and create updated values of the real-time population of the third plurality of users at each second location;
         create an updated predicted population at each second location in real-time subject to the updated values of the real-time population of the third plurality of users at each second location and changes to a number of the second plurality of users directed toward each second location; and subject to the updated predicted population, reroute selected users of the second plurality of users from the selected second location to one or more alternative second locations.

6. The system of claim 5, the alert manager to:

determine a real-time population of skills, occupations, and certifications of the third plurality of users at each second location;

determine a population of the skills, occupations, and certifications of the second plurality of users; and determine, for each second location, a forecasted population of the skills, occupations, and certifications of the third plurality of users.

7. The system of claim 1, the navigation manager to determine the one or more second locations including:

collect information on the infrastructure of the one or more second locations, thereby defining the second locations' infrastructure information;

superimpose the second locations' infrastructure information over one or more maps;

monitor first physical conditions associated with the one or more first locations in real-time;

determine second physical conditions at each of the second locations in real-time;

dynamically add and remove second locations from an inventory of second locations subject to the first and second physical conditions, wherein the inventory of second locations includes a combination of:

public-access structures; and private structures.

8. A computer program product for guiding users to a haven, the computer program product comprising one or more computer readable storage media, and program instructions collectively stored on the one or more computer storage media, the program instructions comprising:

program instructions to transmit to a first plurality of users, through one or more devices at one or more first locations, at least one notification, wherein the at least one notification is initiated at least partially due to one or more first physical conditions associated with the one or more first locations;

program instructions to determine one or more second locations, the one or more second locations different from the one or more first locations, wherein each second location of the one or more second locations is determined to provide at least partial protection from the one or more first physical conditions associated with the one or more first locations;

program instructions to dynamically regulate traffic of a second plurality of users from the one or more first locations to the one or more second locations, wherein the second plurality of users includes at least a portion of the first plurality of users in transit to the one or more second locations;

program instructions to generate one or more predicted traffic densities between the one or more first locations to the one or more second locations, at least a portion of the second plurality of users in possession of at least one of one or more wireless devices; and program instructions to transmit to the second plurality of users routing information from the one or more first locations to the one or more second locations, wherein the routing information is subject to the one or more predicted traffic densities and a dynamic regulation of one or more real-time traffic densities.

9. The computer program product of claim 8, further comprising program instructions to:

regulate one or more emergency vehicles designated for transport of the second plurality of users to each second location, including:

pool one or more subsets of the second plurality of users, wherein each subset of the one or more subsets is assigned to a unique predetermined emergency vehicle;

route each user of each subset of the second plurality of users to the unique predetermined emergency vehicle;

assign the one or more emergency vehicles to transport people not assigned to the unique predetermined emergency vehicle; and route each emergency vehicle to reduce a potential for traffic congestion.

10. The computer program product of claim 8, further comprising program instructions to:

record, for each second location, a real-time population of a third plurality of users;

receive, from each user of the second plurality of users in possession of at least one of the one or more wireless devices and directed toward a respective second location, a real-time location thereof;

determine, subject to a measured rate of progress of each user of the second plurality of users, a time period for each user of the second plurality of users to arrive at a selected second location; and determine, for each second location, a predicted population.

11. The computer program product of claim 10, further comprising program instructions to:

dynamically regulate the population of the third plurality of users at each second location subject to one or more of:

the predicted population at each second location; and a population capacity of each second location, further comprising program instructions to:

record an arrival of each user of the second plurality of users at each second location and create updated values of the real-time population of the third plurality of users at each second location;

create an updated predicted population at each second location in real-time subject to the updated values of the real-time population of the third plurality of users at each second location and changes to a number of the second plurality of users directed toward each second location; and subject to the updated predicted population, reroute selected users of the second plurality of users from the selected second location to one or more alternative second locations.

12. The computer program product of claim 8, further comprising program instructions to:

collect information on the infrastructure of the one or more second locations, thereby defining infrastructure information of the one or more second locations;

superimpose the infrastructure information of the one or more second locations over one or more maps;

monitor first physical conditions associated with the one or more first locations in real-time;

determine second physical conditions at each of the second locations in real-time;

dynamically add and remove second locations from an inventory of second locations subject to the first and second physical conditions, wherein the inventory of second locations includes a combination of:
public-access structures; and
private structures.

13. A computer-implemented method comprising:
transmitting, to a first plurality of users, at one or more first locations, at least one notification, wherein the at least one notification is initiated at least partially due to one or more first physical conditions associated with the one or more first locations;
determining one or more second locations, the one or more second locations different from the one or more first locations, wherein each second location of the one or more second locations is determined to provide at least partial protection from the one or more first physical conditions associated with the one or more first locations; and
dynamically regulating traffic of a second plurality of users from the one or more first locations to the one or more second locations, wherein the second plurality of users includes at least a portion of the first plurality of users in transit to the one or more second locations.

14. The method of claim 13, further comprising:
regulating one or more emergency vehicles designated for transport of the second plurality of users to each second location, comprising:
pooling one or more subsets of the second plurality of users, wherein each subset of the one or more subsets is assigned to a unique predetermined emergency vehicle;
routing each user of each subset of the second plurality of users to the unique predetermined emergency vehicle;
assigning the one or more emergency vehicles to transport people not assigned to the unique predetermined emergency vehicle; and
routing each emergency vehicle to reduce a potential for traffic congestion.

15. The method of claim 14, wherein assigning the one or more emergency vehicles to transport people not assigned to the unique predetermined emergency vehicle comprises:
receiving, by at least one of the one or more emergency vehicles, a first transmission from a third user selected from the group consisting of the first and second pluralities of users, the third user at a third location different from the one or more second locations and not assigned to any unique predetermined emergency vehicles, through at least one of the one or more wireless devices, the first transmission including a request to pick up the third user and third location data;
receiving, by at least one of the one or more second locations, a second transmission from the third user, the second transmission an intention of the third user to transit to the at least one of the one or more second locations;
routing at least one of the one or more emergency vehicles to pick up the third user; and
routing the emergency vehicle containing the third user to the one of the one or more second locations.

16. The method of claim 13, further comprising:
predicting routes prone to congestion, subject to one or more of historical route congestion data and real-time tracking of the second plurality of users; and
determining unavailable routes and direct the second plurality of users around the unavailable routes.

17. The method of claim 13, further comprising:
generating one or more predicted traffic densities between the one or more first locations to the one or more second locations, at least a portion of the second plurality of users in possession of at least one of one or more wireless devices; and
transmitting, to the second plurality of users, routing information from the one or more first locations to the one or more second locations, wherein the routing information is subject to the one or more predicted traffic densities and a dynamic regulation of one or more real-time traffic densities;
recording, for each second location, a real-time population of a fourth plurality of users;
receiving, from each user of the second plurality of users in possession of the at least one of the one or more wireless devices and directed toward a respective second location, a real-time location thereof;
determining, subject to a measured rate of progress of each user of the second plurality of users, a time period for each user of the second plurality of users to arrive at a selected second location; and
determining, for each second location, a predicted population.

18. The method of claim 17, further comprising:
dynamically regulating the population of the fourth plurality of users at each second location subject to one or more of:
the predicted population at each second location; and
a population capacity of each second location, the method further comprising:
recording an arrival of each user of the second plurality of users at each second location and create updated values of the real-time population of the fourth plurality of users at each second location;
creating an updated predicted population at each second location in real-time subject to the updated values of the real-time population of the fourth plurality of users at each second location and changes to a number of the second plurality of users directed toward each second location; and
subject to the updated predicted population, rerouting selected users of the second plurality of users from the selected second location to one or more alternative second locations.

19. The method of claim 18, further comprising:
determining a real-time population of skills, occupations, and certifications of the fourth plurality of users at each second location;
determining a population of the skills, occupations, and certifications of the second plurality of users; and
determining, for each second location, a forecasted population of the skills, occupations, and certifications of the fourth plurality of users.

20. The method of claim 13, further comprising:
collecting information on the infrastructure of the one or more second locations, thereby defining infrastructure information of the one or more second locations;
superimposing the infrastructure information of the one or more second locations over one or more maps;
monitoring first physical conditions associated with the one or more first locations in real-time;
determining second physical conditions at each of the second locations in real-time;
dynamically adding and removing second locations from an inventory of second locations subject to the first and second physical conditions, wherein the inventory of second locations includes a combination of:
public-access structures; and
private structures.

* * * * *